United States Patent [19]
Perla

[11] Patent Number: 5,622,762
[45] Date of Patent: Apr. 22, 1997

[54] WET SUIT MATERIAL

[76] Inventor: Ivan L. Perla, 5437 Hansel Ave. J-10, Orlando, Fla. 32809

[21] Appl. No.: 257,142

[22] Filed: Jun. 9, 1994

[51] Int. Cl.$^6$ .............................. B65D 65/28; B32B 3/02; B32B 33/00; A41D 13/10

[52] U.S. Cl. .................. 428/43; 428/81; 428/86; 428/92; 428/97; 428/153; 428/156; 428/537.5; 2/15; 2/16

[58] Field of Search ................ 428/43, 81, 153, 428/156, 537.5, 906, 86, 92, 97; 2/15, 16

[56] References Cited

U.S. PATENT DOCUMENTS

| | | | |
|---|---|---|---|
| 4,531,242 | 7/1985 | Levine | 2/16 |
| 5,082,707 | 1/1992 | Fazio | 428/43 |

Primary Examiner—Thurman K. Page
Assistant Examiner—Kathryne E. Shelborne
Attorney, Agent, or Firm—James H. Beusse

[57] ABSTRACT

A multi-layer material suitable for production of divers' suits, such material eliminating the conventional waterproof material characteristic of the prior art. In one form, the multi-layer material comprises an outer layer of Lycra bonded to a first inner layer of a plush-type material which is then bonded to a second inner layer of a denser plush-type material. The bond between the Lycra and first inner plush layer is preferably formed by coating the facing surfaces with a solid film of a water resistant contact cement which resists any transfer of water between the Lycra and first inner plush layer. The first inner plush layer is then bonded to the second inner plush layer by either an adhesive or other fastening means which allows water transfer between the first and second plush-type material layers.

5 Claims, 1 Drawing Sheet

WET SUIT MATERIAL

The present invention relates to a diver's suit and, more particularly, to an improved material for manufacture of divers' suits.

BACKGROUND OF THE INVENTION

Conventional divers' suits are produced from neoprene and have numerous disadvantages. For example, when suits are folded for traveling, the neoprene creases at the folds and tends to retain the creases. Creases create air pockets which produce buoyancy. Another disadvantage is that neoprene is a closed cell foam material containing air pockets which, at normal atmospheric pressure, provide good insulative characteristics. However, under pressures experienced in a routine dive, the pockets collapse allowing the neoprene to be compressed to a fraction of its normal thickness with a concurrent decrease in insulative characteristics at a depth at which those characteristics are most needed, i.e., where the water is colder. Further, the air pockets make the suit more buoyant at shallow depths requiring use of weights for diving. Still further, the neoprene suits are generally difficult to don since they are desirably tight in order to eliminate air trapped between the suit and diver.

One prior art attempt to alleviate some of the above disadvantages has been to form a wet suit material of an outer Lycra fabric bonded to an inner plush fabric. One such material is available from Malden Mills, Inc. under the designation Polartec 2000. This material fails to overcome all the above disadvantages since it does not have the insulative qualities of suits made from neoprene.

SUMMARY OF THE INVENTION

It is an object of the present invention to provide a construction material for divers' suits which overcomes the above and other disadvantages of the prior art. In an exemplary form, the present invention comprises a multi-layer material suitable for production of divers' suits, such material eliminating the conventional waterproof material characteristic of the prior art. In one form, the multi-layer material comprises an outer layer of Lycra bonded to a first inner layer of a plush-type material which is then bonded to a second inner layer of a denser plush-type material. The bond between the Lycra and first inner plush layer is preferably formed by coating the facing surfaces with a solid film of a water resistant contact cement which resists any transfer of water between the Lycra and first inner plush layer. The first inner plush layer is then bonded to the second inner plush layer by either an adhesive or other fastening means which allows water transfer between the first and second plush-type material layers.

When the inventive material is used in a diver's wet suit, the edges, e.g., the ends of sleeves, ends of legs or neck openings, are left unfinished such that the multiple layers are exposed at the edges to water during a dive. The inner plush layers act to "wick" water into the suit where it is held in the fibers of the plush layers. This trapped water becomes an insulative layer heated by the diver's body heat. The water resistant bonding film resists transfer of water from the plush layer outward and from the Lycra layer inward. The Lycra serves as an outer protective layer against coral or similar objects and holds the loosely sewn plush layer together. The plush layers are less compressed by deeper water since they are saturated with water and no air pockets remain. Accordingly, the material does not lose its insulation capability in deep water.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
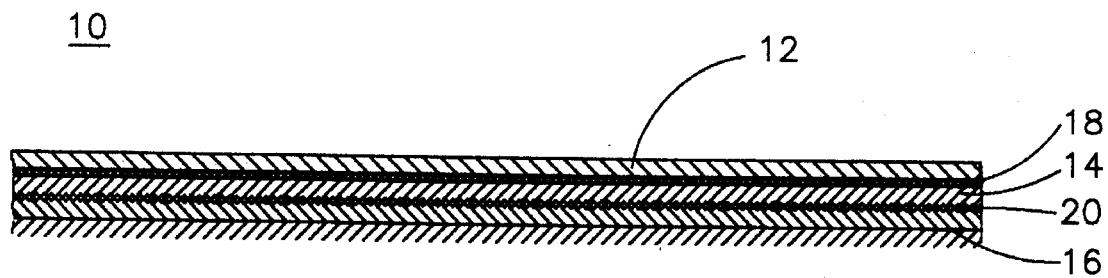
FIG. 1 is a cross-sectional view of a composite material in accordance with the present invention.

For a better understanding of the invention, reference may be made to the following detailed description taken in conjunction with the drawing figure showing a cross-sectional representation of the inventive material.

Referring to the drawing, the material of the present invention is represented schematically at 10 by an outer protective layer 12 of a structural fabric material such as Lycra or a nylon fabric material, a first inner layer 14 of a commercially available plush type material and a second inner layer 16 of a denser plush type material. The plush type material may be cotton, silk or other type of fabric. The denser plush type material may be created from ordinary plush fabric by sizing the fabric to shrink it to a smaller, more dense form. Plush fabric is sometimes referred to as a pile material. Preferably, the second inner layer 16 is a woven plush fabric having pile on both sides rather than a single side. The first inner layer 14 has a single pile surface and a conventional fabric surface which is placed adjacent the Lycra material layer 12. The layer 16 is sometimes referred to as a double plush material.

A bonding layer 18 between the outer Lycra layer and first inner plush material layer 14 is preferably with a contact cement which is spread so as to substantially cover the mating surfaces. The resultant bond forms essentially a continuous film which is effective to inhibit transfer of water between the Lycra layer and the first inner plush layer. In contrast, bonding, indicated at 20, between the first and second plush layers is desirably permeable to water. Bonding can be achieved in various forms from a porous adhesive to spot joint with adhesive or other type fasteners, including stitching. Note that the interface between layers 14 and 16 is a pile-to-pile interface.

Applicant has found that a composite material of Lycra-plush-plush layers can be formed with an R-factor equivalent to or higher than the same thickness of neoprene. Furthermore, since water wicks into the plush material and displaces any air, a diver's wet suit made from this inventive material does not lose its R-factor at depth in the manner of neoprene.

In use, the multi-layer material is sewn in a conventional manner into the form of a wet suit except that it is desirable to leave terminating edges of the material exposed. Such edges may occur at the ends of sleeves or legs or around the neck area of the suit. These open edges provide openings for water to wick into the plush material filling all voids and displacing air. Thus, when the suit is worn, the water wicked into the plush material is warmed by contact with the user and creates an insulating layer to protect the diver from extreme cold temperatures. A typical material of the present invention may be about 4 mm in thickness and have an equivalent R-factor as 4 to 6.5 mm rubber.

A diver's suit constructed from this inventive material has an outer protective shell (of Lycra or similar material) and a comfortable inner layer of plush material in contact with the diver. The plush inner layer makes the suit easy to slip into without use of powder or other skin lubricants. Further, applicant has found that this material does not retain creases and thus can be folded and packed for ease of travel.

In comparison to the prior art, the inventive material includes a double-plush layer which captures an insulative water film and creates a constant R-factor for heat insulation.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A multi-layer material for a diver's wet suit comprising:
   an outer layer of a structural fabric;
   a first inner layer of a plush layer of cotton, silk or synthetic fabric bonded to said outer layer;
   a second inner layer of a plush layer of cotton, silk or synthetic fabric attached to said first inner layer opposite said outer layer; and
   a water resistant bond between said outer layer and said first inner layer.

2. The multi-layer material of claim 1 wherein said second inner layer is more dense than said first inner layer.

3. The multi-layer material of claim 2 and including a water permeable bond between said first and second inner layers.

4. The multi-layer material of claim 3 formed into a wet suit and having open edges for wicking water into the plush material to displace air.

5. The multi-layer material of claim 3 wherein said second inner layer comprises a double plush fabric cotton, silk or synthetic fabric.

* * * * *